F. W. WOOD.
TELEGRAPH DISPLAY SIGNAL.
APPLICATION FILED FEB. 11, 1909.
1,067,629.
Patented July 15, 1913
6 SHEETS—SHEET 1.
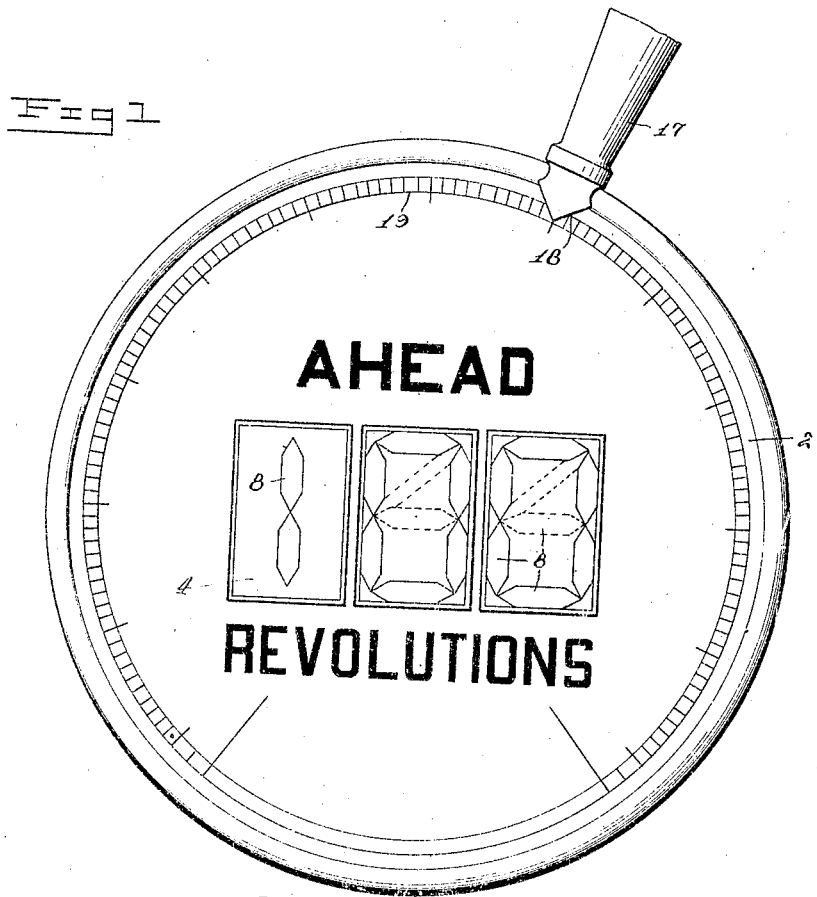
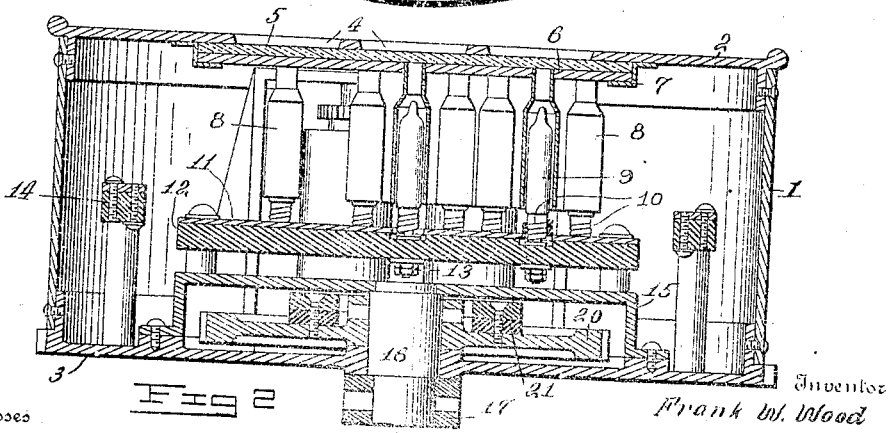

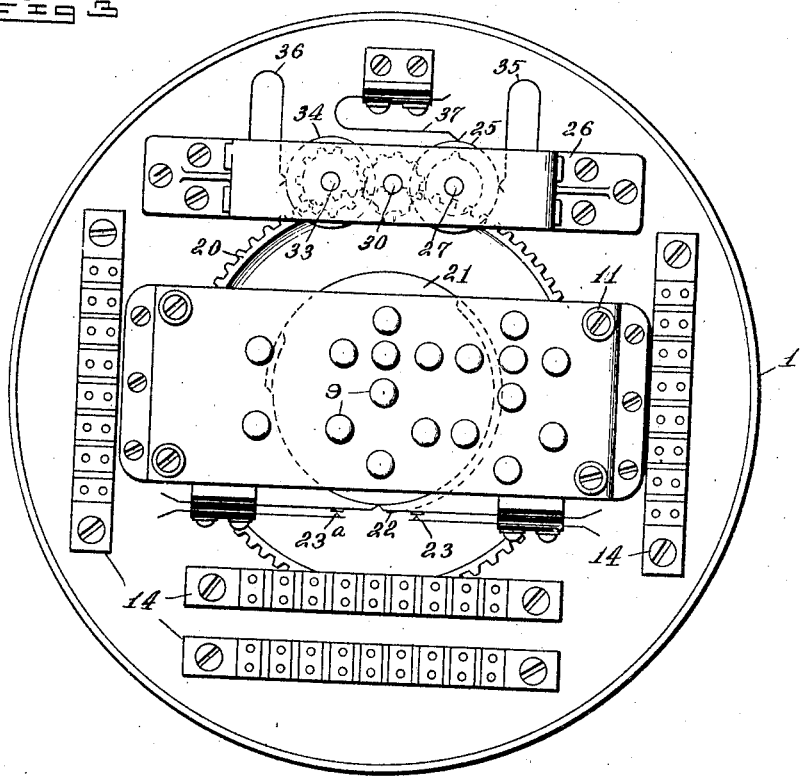

F. W. WOOD.
TELEGRAPH DISPLAY SIGNAL.
APPLICATION FILED FEB. 11, 1909.
1,067,629.
Patented July 15, 1913.
6 SHEETS—SHEET 3.
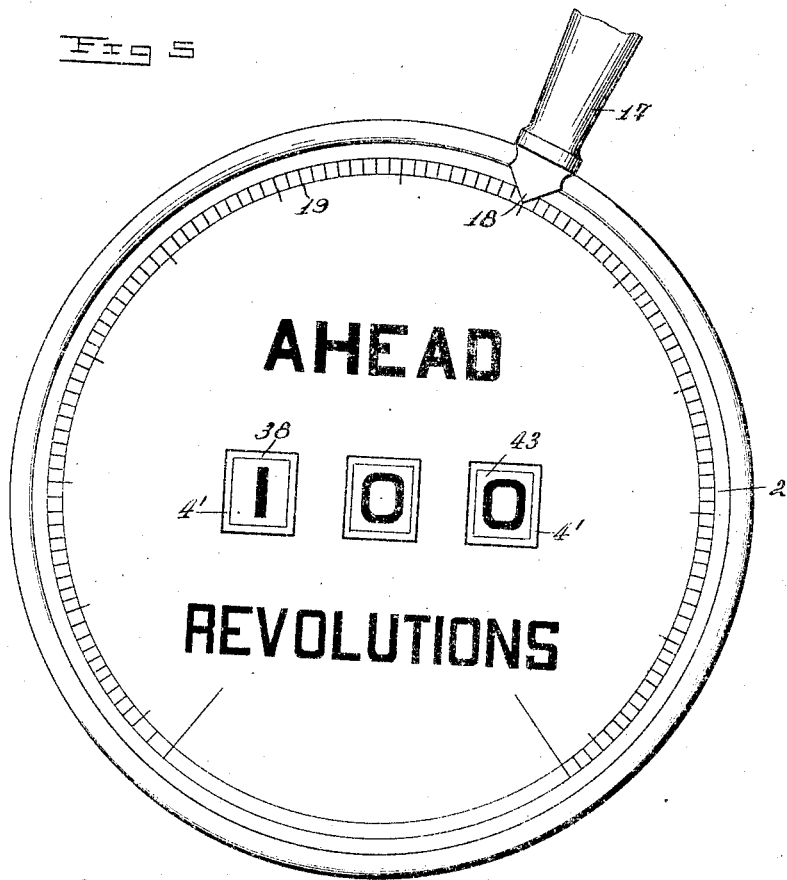
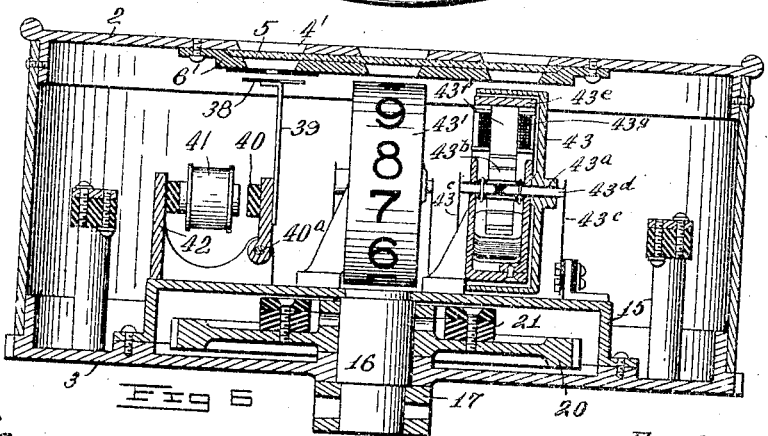
Witnesses
H. A. Robinette
J. Hanson Boyden
Inventor
Frank W. Wood
By Meyers, Cushman & Rea
Attorney F. W. WOOD.
TELEGRAPH DISPLAY SIGNAL.
APPLICATION FILED FEB. 11, 1909.
1,067,629.
Patented July 15, 1913.
6 SHEETS—SHEET 4.
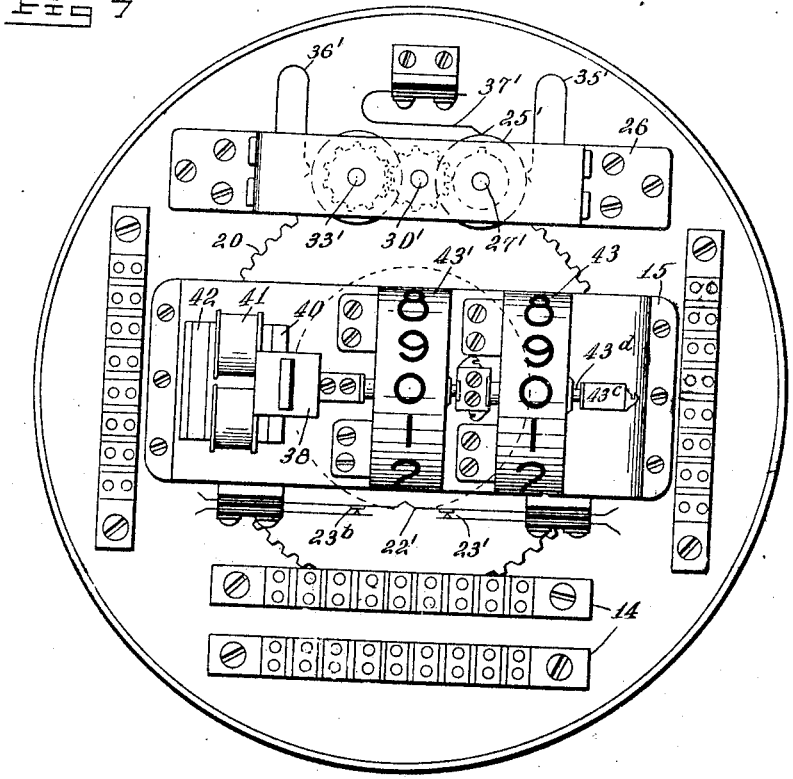
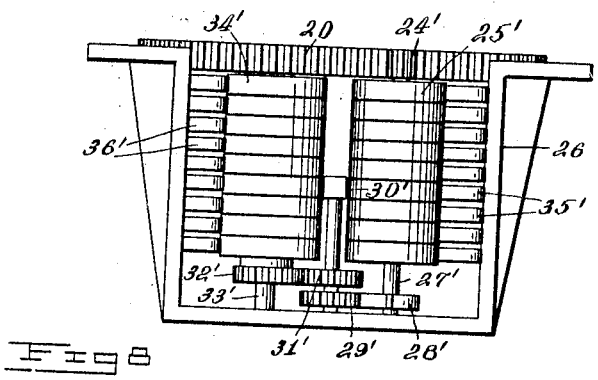
Witnesses
H. A. Robinetta
J. Hanson Boyden
Inventor
Frank W. Wood
By Meyers, Cushman & Rea
Attorney

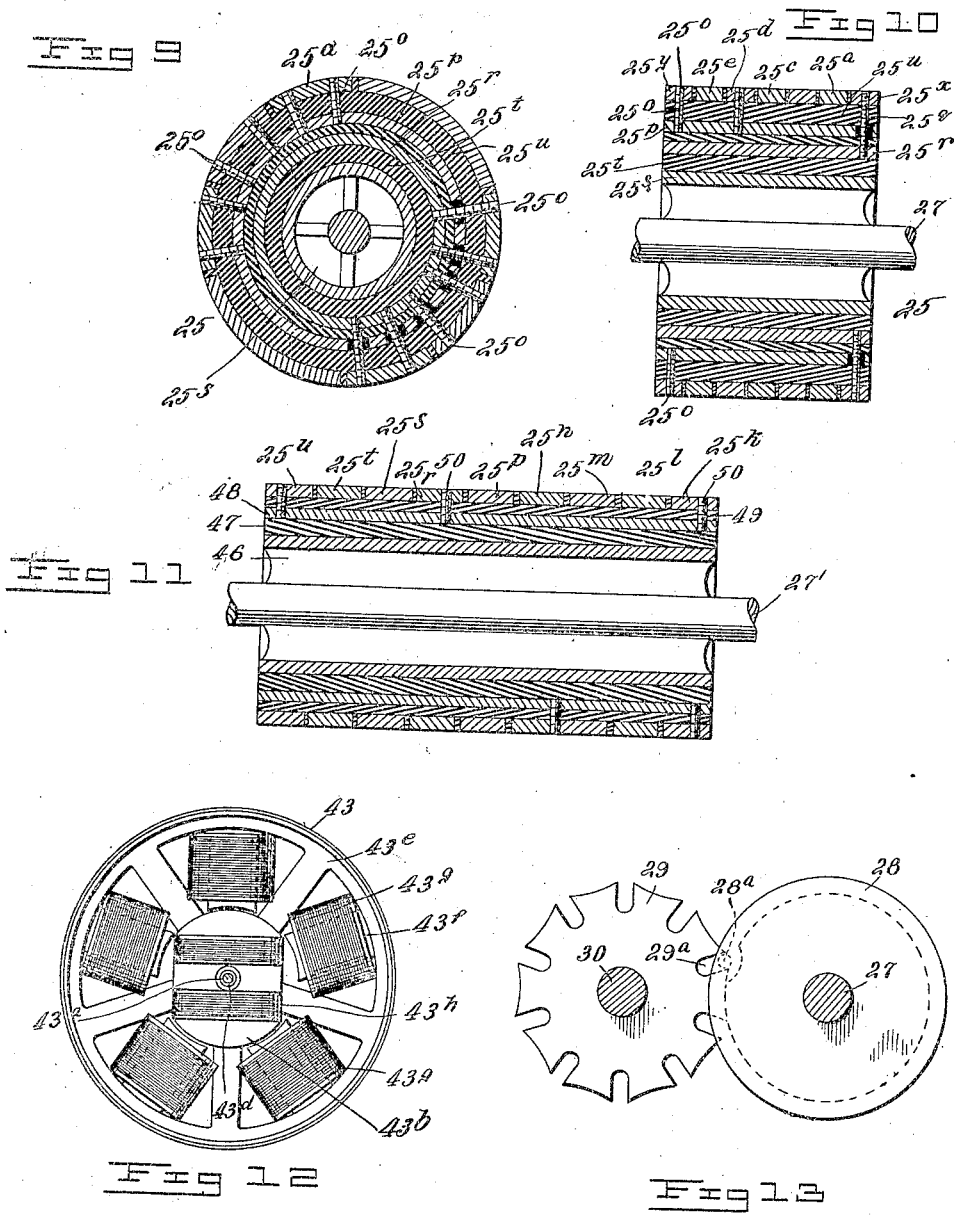

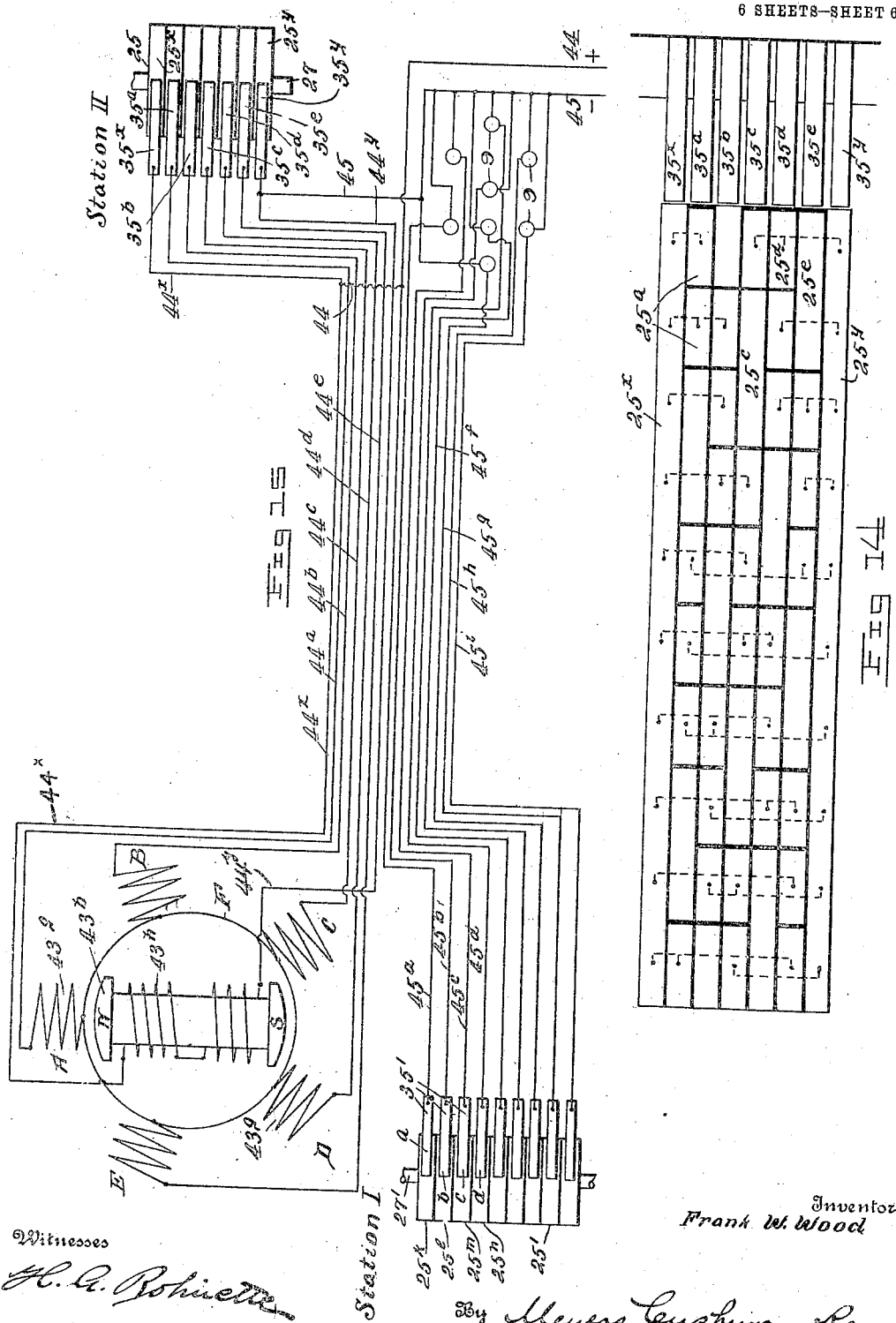

UNITED STATES PATENT OFFICE.

FRANK W. WOOD, OF NEWPORT NEWS, VIRGINIA, ASSIGNOR, BY MESNE ASSIGN-
MENTS, TO CHARLES CORY & SON, INC., OF NEW YORK, N. Y., A CORPORATION OF
NEW YORK.

TELEGRAPH DISPLAY-SIGNAL.

1,067,629.  Specification of Letters Patent.  Patented July 15, 1913.

Application filed February 11, 1909. Serial No. 477,375.

*To all whom it may concern:*

Be it known that I, FRANK W. WOOD, a citizen of the United States, residing at Newport News, in the county of Warwick and State of Virginia, have invented new and useful Improvements in Telegraph Display-Signals, of which the following is a specification.

My invention relates to display signals, and more particularly to signals of the telegraph type, by means of which intelligences can be conveyed from one station to another.

The invention is especially designed for use as a ship's telegraph, but is obviously equally well adapted for the transmission of orders or information between any two stations whatsoever.

The primary object of the invention is to provide a system which shall be absolutely reliable in operation, and in which a signal received at one station is repeated back to the sending station.

A further object is to provide a transmitting device comprising a plurality of circuit controllers so organized and arranged that they may be simultaneously operated by means of a single lever.

A still further object of the invention is to provide an improved receiver for displaying the signals, and comprising an electric motor of the step by step type, and means for controlling the same.

With the above and other objects in view, and to simplify and improve generally upon the details of such apparatus, my invention consists in the construction and arrangement of parts hereinafter described, and illustrated in the accompanying drawings in which,—

Figure 1 is a front elevation of one form of signaling instrument, complete. Fig. 2 is a central transverse section thereof. Fig. 3 is a front elevation of the mechanism making up such instrument, the front wall of the casing being removed. Fig. 4 is a plan view of the contact drums and associated gearing, in such instrument. Fig. 5 is a view similar to Fig. 1, but showing a different form of signaling instrument. Fig. 6 is a central, transverse section through the instrument shown in Fig. 5, parts being in elevation. Fig. 7 is a front elevation of the mechanism contained in the instrument of the type shown in Fig. 5; the front wall of the casing being removed. Fig. 8 is a plan view of the contact drums and associated gearing employed in such instrument. Fig. 9 is a transverse section of one of the contact drums shown in Fig. 4. Fig. 10 is a central, longitudinal section thereof. Fig. 11 is a central, longitudinal section of one of the drums shown in Fig. 8. Fig. 12 is a side elevation of the motor device forming a part of one of the receivers. Fig. 13 is a detail view, illustrating the Geneva gears employed for driving the drums. Fig. 14 is a development of the contact drum shown in Figs. 9 and 10, and Fig. 15 is a diagram of the electric circuits connecting two stations between which signals may be transmitted and received.

In the embodiment of the invention illustrated in the drawings, I have shown the same as constructed for use as an engine revolution telegraph on ship-board. It frequently is desirable for the officer in charge of the vessel to transmit to the engineer orders as to exactly how many revolutions per minute he desires the engine to be run. To this end one signaling instrument is placed on the bridge, or other convenient location, while another instrument is placed in the engine room, the two instruments being connected by a suitable insulated cable containing the wires making up the necessary electrical connections.

Referring to the drawings in detail, and more particularly to Figs. 1 to 4, showing one construction which I employ, the signaling instrument comprises a cylindrical casing 1, having a front plate 2, and a back plate 3, secured thereto. The front plate is provided in its center with a series of sight openings 4 through which the various signals may be displayed. Beneath the openings 4 is arranged a plate 5, preferably formed of ground glass or other translucent material, and behind this plate of glass is another plate 6, preferably of metal, the two plates being secured to the front wall 2 of the casing as by means of brackets 7.

Set into the plate 6 is a series of lamp cells 8, arranged in such configuration as to form a monogram capable of producing any required digit. Each lamp cell comprises an enlarged body portion, adapted to receive an electric lamp 9, and a narrow or reduced portion adapted to be set into the plate 6, and to form against the background 5 a translucent bar of light, constituting a character element. For the purposes required in the present case, it has been found necessary to provide only two monograms, as shown in Fig. 1, each capable of forming any digit whatever. These are arranged in the units and tens places, while the digit in the hundreds place consists simply of a pair of cells arranged to form the numeral 1, since the present instrument is never required to display a number as large as 200.

As shown in Fig. 1, each monogram comprises a pair of rectangles having a common side, and a diagonal extending between opposite corners of one of said rectangles, thus requiring only eight cells to form the complete monogram, capable of producing any digit. The instrument as shown in Fig. 1, is set so as to display the number "100," and in this condition, all of the cells are illuminated, except the diagonal and transverse cells, which are shown in dotted lines.

The lamps 9 are supported in sockets 10, secured to a metal plate 11, which forms a common return for all of the lamps. This plate 11 is secured to a plate 12 or insulating material, through which plate extend pins contacting with the center of the lamp bases, and provided at their other ends with nuts 13, forming the other terminals of the lamps. Wires extend from these terminals to supporting racks 14, from which the outgoing wires lead. The plate 12 is preferably supported on a bracket 15, secured to the rear wall 3 of the casing.

Mounted upon a shaft 16, journaled in bearings in the bracket 15 and rear wall 3 of the casing, is an operating handle 17, which extends up radially over the edge of the casing, and thence forwardly to the front wall thereof where it is provided with a pointer 18 coöperating with an annular scale 19 formed on such front wall. Also mounted on the shaft 16, inside the casing, is a gear wheel 20, the purpose of which will be hereinafter described. Secured to this gear wheel is a cam disk 21, preferably formed of insulating material, and serving to engage a spring 22 (see Fig. 3), so as to close contacts 23 and 23ª for the purpose of operating a signal at the receiving station, as hereinafter pointed out. The gear wheel 20 meshes with a pinion 24 carried at the end of a shaft 27, journaled in a bracket 26, and on which shaft is mounted a contact drum 25 for controlling the circuits to the receiving device of the signaling instrument at another station, all as hereinafter more fully described.

Mounted on the shaft 27, at its forward end, is a wheel 28 provided with a pin 28ª (see Fig. 13), which coöperates with notches 29ª in a Geneva gear 29, mounted on a counter-shaft 30. Also mounted on this shaft 30 is a pinion 31, which engages a similar pinion 32, carried by a shaft 33, also journaled in the bracket 26, and on which is mounted a second drum 34, similar to the drum 25. Rows of bow-shaped contact springs 35, 36, suitably supported, are arranged to coöperate with the drums 25 and 34, as hereinafter explained. An additional contact spring 37, coöperating with the drum 25, may also be employed, if desired, and connected with a bell circuit, so that the bell will be caused to vibrate as the drum revolves, so as to indicate to the operator that a signal is being transmitted.

In Figs. 5 to 8 inclusive, which correspond to Figs. 1 to 4 inclusive, above described, I have illustrated a somewhat different form of signaling instrument, and for the sake of clearness I have used the same reference characters wherever possible, priming them where the construction of the part is different, or where the part bears a different relation to the other parts. With this explanation, the general features of this apparatus will be understood from inspection. Instead, however, of employing an illuminated display signal, I make use of a receiving device comprising a rotary drum having characters formed thereon, and a step by step electric motor for operating such drum. As in the construction shown in the first four figures, the instrument shown in Fig. 5 is provided with three sight openings 4', corresponding to the units, tens and hundreds places, and as in the other construction, I provide means for producing any digit whatever in the units and tens places, while in the hundreds place, it is only necessary to produce the digit 1. For controlling this digit, I arrange immediately beneath the corresponding sight openings a plate 38, having the numeral 1 formed thereon. This plate is supported at the end of a lever 39 secured to an armature 40, pivoted at 40ª to a fixed support. Coöperating with the armature 40 is an electromagnet 41, supported by means of a yoke 42 attached to the bracket 15. It is obvious that with this construction, the energizing and deënergizing of the magnet 41 serves to move the plate 38, so as to bring the numeral 1 into and out of the field of vision provided by the sight opening 4'. For the units and tens position, however, I have illustrated motor devices, here designated in their entirety by the numerals 43 and 43'. respectively. Since these are identical in construction, a description of one will suffice for both. By reference to Figs. 6 and 12 particularly, it will be seen that each such motor device comprises a drum 43 on which is formed the numerals from 0 to 9. This drum is mounted on a shaft 43ª supported in the motor frame. Also mounted on this shaft is an armature 43ᵇ having coils 43ʰ. Set into each end of the shaft, but insulated therefrom, is a pin 43$^d$, against the end of which bears a contact spring 43$^c$, these springs forming the terminals of the armature winding. The frame of the motor comprises a ring 43$^e$ having a number of inwardly projecting pole pieces 43$^f$, around each of which is wound a magnetizing coil 43$^g$. These pole pieces constitute the motor field, and by progressively changing their relative magnetization a rotation of the armature is produced, as more fully explained hereinafter.

In the present case, for the sake of illustration, I have shown in Fig. 15 two signaling stations each equipped with a signaling instrument, one of said instruments being of the type shown in Figs. 1 to 4, and the other of said instruments being of the type shown in Figs. 5 to 8. It is to be particularly noted that this is for the purpose of illustration only, since it is equally feasible, and in a number of cases preferable, to employ identically the same type of instrument at both ends of the line. Different types of circuit controllers are required, however, and consequently in the drawings I have illustrated in one signaling instrument a receiver of the lamp type, and a transmitting device corresponding to a receiver of the step by step motor type, while in the other signaling instrument I have illustrated a receiver of the step by step motor type and a transmitter adapted to control a receiver of the lamp type. It will, therefore, be understood that in case instruments of the same type are used at both ends of the line, the proper transmitter for the type of receiver employed will, of course, be selected.

In Figs. 4, 9, 10 and 14, I have illustrated a circuit controller adapted to operate the receiver of the motor type, as illustrated in Figs. 6 and 12. By reference to these figures, it will be seen that each of the drums 25 comprises a central metallic spider 25$^s$, surrounding which is a sleeve 25$^t$ of insulating material. Over this sleeve is secured a cylinder 25$^r$ of metal, and this in turn is surrounded by a second sleeve of insulating material. Over this is superposed a second metallic cylinder 25$^p$, which is again surrounded by a cylinder 25$^u$ of insulating material. To this insulating material 25$^u$ are secured the various contact strips making up the surface of the cylinder. Such strips comprise continuous metallic bands 25$^x$ and 25$^y$, located at the ends of the cylinder and intermediate strips 25$^a$ to 25$^e$, inclusive, formed in sections, as clearly shown in Fig. 14, such sections being insulated from each other, except as now described. In order to form the proper electrical connections between the various sections, these strips are secured by means of screws 25$^o$ and 25$^q$ to the metallic cylinders 25$^p$ and 25$^r$, respectively. It will be seen that by connecting certain specific strips or sections to either of these cylinders, any desired strips can be connected together as required to form the proper circuits. It may be stated here that the outside strips 25$^x$ and 25$^y$ are connected to the cylinders 25$^r$ and 25$^p$ respectively, and form the positive and negative terminals of the circuits. Referring again to Fig. 14, which is a development of the surface of this drum, the various connections between the several sections and end strips are indicated by dotted lines. Coöperating with the contact drum 25 is a set of contact fingers 35$^x$, 35$^y$ and 35$^a$ to 35$^e$ inclusive, such contact fingers being connected to the motor 43 as shown in Fig. 15, and hereinafter more fully explained. It will thus be apparent that as the drum is shifted, the relative electrical connections between the spring fingers will be changed as every new set of contact strip sections engages the spring fingers.

One of the drums for controlling the lamp type of receiver is illustrated in Fig. 11. This construction is very similar to that shown in Figs. 9 and 10, although simpler. It comprises a spider 46 surrounded by an insulating sleeve 47, over which is fitted a metallic cylinder 48. This in turn is surrounded by an insulating sleeve 49 on which the contact strips are mounted. These strips are also formed in insulated sections, and certain of the sections are connected with the metallic cylinder 48 by means of screws 50. In this connection it may be stated that the end strip 25$^k$ is a continuous band and forms the common return for the lamp circuits, while the other strips, designated 25$^l$, 25$^m$, etc., are sectional, and serve in connection with the contact strips 35′ to select the proper lamps.

The operation of the apparatus and system can be best understood from an inspection of Fig. 15, which is a diagrammatic view showing the circuit connections between a single digit transmitting and displaying device at each station. In other words, this figure shows at one station sufficient lamps for operating, say the unit monogram, and at the other station a single motor device serving to display the digits of, say the units place, while at each station is shown a single transmitting device for each of the corresponding receivers. The motor illustrated is shown as comprising five field coils, which I have designated A, B, C, D and E, and a single armature coil 43$^h$. The terminals of the armature coil are connected by means of wires 44$^x$ and 44$^y$ to the end brushes or contact fingers 35$^x$ and 35$^y$, which coöperate with the continuous bands 25$^x$ and 25$^y$ on the drum 25. Electric current is supplied to the system through the wires 44, 45 shown at the right of Fig. 15, and these wires are connected to the wires 44$^x$ and 44$^y$ so that current is constantly supplied to the armature coil 43$^h$ and to the end rings 25$^x$ and 25$^y$ on the contact drum. The armature 43$^h$ is, therefore, continuously magnetized and has a polarity as designated, say, by the letters N and S. The inside terminals of all of the field coils are connected together, and the individual outside terminals of these coils are connected by wires 44$^a$, 44$^b$, etc., with the corresponding contact fingers 35$^a$, 35$^b$, etc., at station II. It will thus be seen that, assuming the drum 25 to be in such a position relative to the contact fingers, that the coils C and D of the motor are energized in such a manner as to render their inner ends of "north" polarity, while the coil A is energized in such a manner as to render its inner end of "south" polarity, the armature will assume the position shown in the drawings, thus causing a certain digit to appear at the sight opening. With the parts in this condition, circuits through the motor may be traced as follows: Beginning at the wire 44 at the lower right hand corner of the figure, current flows to the wire 44$^x$, thence to the brush 35$^x$, thence to the contact strip 25$^x$, thence by means of the screw connections shown in Figs. 9 and 10, to the strip 25$^a$, thence out over the brush 35$^a$, wire 44$^a$, magnet coil A, common connection F, through coil C, wires 44$^c$, contact brush 35$^c$, contact strip 25$^c$, to the metallic cylinder 25$^p$ (see Fig. 10), thence to the contact band 25$^y$, contact brush 35$^y$, wire 45, to the negative terminal. Current also flows from the common connection F through coil D, wire 44$^d$, contact brush 35$^d$, contact strip 25$^d$, through the metallic cylinder 25$^p$, and out as before, thus energizing the three coils A, C, and D as above described.

When it is desired to bring a new digit to the sight opening, the drum 25 is shifted so as to change the circuit connections in such a manner as to vary the relative magnetization of the pole pieces of the motor, and thus cause the armature to assume a new position. In this connection it will be noted that upon shifting the drum 25 to its next position, the pole pieces A, B and D will be energized, the inner ends of A and B being south poles and the inner end of pole D being a north pole. Therefore, the armature will take up a position with its north pole half way between the pole pieces A and B. It will thus be seen that the number of positions to which the armature can be set is twice as great as the number of pole pieces. In the embodiment shown, I have illustrated the motor as provided with five pole pieces, and therefore the armature is capable of assuming ten different positions.

The operator at station I, upon observing the signal displayed through the sight opening in his instrument, may repeat the signal to the transmitting station, and thus indicate to the operator at station II that the signal has been received correctly. This he might do by means of a duplicate of the apparatus just described, but as shown in the drawings the instrument at station II is provided with a receiver of the lamp type, and these lamps are controlled by means of the drum 25' at station I. The contact fingers 35' are connected with the various lamps 9 at station II, constituting the monogram, by means of wires 45$^a$, 45$^b$, etc. In order to produce the desired digit in the monogram at station II, the operator at station I moves his handle 17 to the correct point as indicated by the pointer 18 on the scale 19, and thus sets the contact drum 25' so as to close the proper circuits through the lamps. These circuits may be traced as follows: Beginning at the positive terminal 44, current flows through the wire 45$^a$ to the contact brush $a$, and thence to the ring 25$^k$. From this ring 25$^k$, it is distributed by means of the metallic cylinder 48 (see Fig. 11) to the various sectional contact strips 25$^l$, 25$^m$, etc., and from these strips it is taken up by contact brushes $b$, $c$, $d$, etc., and is led through the wires 45$^b$, 45$^c$, 45$^d$, etc., through the corresponding lamps 9 at station II, from which it passes to the negative terminal 45.

It is especially to be noted that I employ but a single lever for transmitting a number comprising three or more digits. This is effected by means of the Geneva gears above described. By reference to Figs. 1, 3 and 4, for instance, it will be seen that the operating handle 17 is attached to the large gear 20 which meshes with the pinion 24, fast on the shaft of the units drum 25. This drum in turn is geared to the tens drum 34 through the medium of the Geneva gears 28 and 29. Since the wheel 29 has ten teeth, and the wheel 28 carries but a single pin, it is obvious that it will require ten revolutions of the drum 25 in order to produce one revolution of the drum 34. In transmitting any desired number, therefore, the operating handle 17 is simply swung around until the pointer 18 is opposite the desired number, whether such number be composed of one, two or three digits. Suppose for example, the number to be transmitted is "125". A movement of the operating handle to this position will, of course, cause the drum 25 to spin rapidly and for each revolution move the drum 34 one tooth. When the handle is stopped at the desired point, however, it will leave the drum 25 in the proper position to produce the digit 5 in the units place, and the drum 34 in the proper position to produce the digit 2 in the tens place, while the cam disk 21 will have been turned to such position as to close the circuits at 23 and 23$^a$, and thus produce the digit 1 in the hundreds place. In the embodiment shown, the contacts 23 and 23$^a$ in Fig. 3 control the circuit of the magnets 41 in Figs. 6 and 7, and the contacts 23′ and 23ᵇ in Fig. 7 control the circuits to the lamps in the cells 8, which produce the digit 1 in the hundreds place in Fig. 1. It will be appreciated that the use of a single lever for thus transmitting any desired order results in a great saving of time and ease of manipulation, as distinguished from prior constructions in which three or more independent levers were employed.

It will thus be seen that I have provided telegraph signal apparatus which may be rapidly and accurately operated, and in which all signals transmitted may be repeated at the sending station, and it is therefore thought that the numerous advantages of my invention will be readily appreciated by those skilled in the art.

What I claim is:—

1. In a telegraph display signal system, a receiver and a transmitter constructed to move in synchronism, said receiver including a motor having a plurality of pole pieces, and said transmitter comprising a contact drum constructed to select and energize any of said pole pieces, said contact drum comprising a pair of concentric conducting cylinders insulated from each other, and a series of insulated sectional contact strips, some of said strips being connected to one of said cylinders, and some to the other.

2. In a telegraph display signal system, a receiver and a transmitter constructed to move in synchronism, said receiver including a motor having a plurality of pole pieces, and said transmitter comprising a contact drum constructed to select and energize any of said pole pieces, said contact drum including in its structure a pair of cylindrical conductors insulated from each other, and a series of insulated sectional contact strips, some of said strips being connected to one of said conductors, and some to the other.

In testimony whereof I have hereunto set my hand in presence of two subscribing witnesses.

FRANK W. WOOD.

Witnesses:
 Eugene E. Losee,
 Arthur K. Lappenden.